(12) United States Patent
England et al.

(10) Patent No.: US 11,578,764 B2
(45) Date of Patent: Feb. 14, 2023

(54) FLEXIBLE FLYWHEEL COUPLING

(71) Applicant: Dodge Industrial, Inc., Oxford, CT (US)

(72) Inventors: Christopher L. England, Laurens, SC (US); Galen E. Burdeshaw, Simpsonviile, SC (US)

(73) Assignee: Dodge Industrial, Inc., Oxford, CT (US)

( * ) Notice: Subject to any disclaimer, the term of this patent is extended or adjusted under 35 U.S.C. 154(b) by 296 days.

(21) Appl. No.: 16/807,831

(22) Filed: Mar. 3, 2020

(65) Prior Publication Data

US 2021/0277957 A1   Sep. 9, 2021

(51) Int. Cl.
*F16D 3/74* (2006.01)
*F16D 1/08* (2006.01)

(52) U.S. Cl.
CPC .............. *F16D 3/74* (2013.01); *F16D 1/0847* (2013.01); *F16D 2003/745* (2013.01)

(58) Field of Classification Search
CPC ..... F16D 3/74; F16D 1/0847; F16D 2003/745
USPC ..................................................... 464/80, 88
See application file for complete search history.

(56) References Cited

U.S. PATENT DOCUMENTS

| 2,873,010 | A | * | 2/1959 | Alma | F16D 3/74 |
| 3,623,339 | A | * | 11/1971 | Muller | F16D 3/72 |
| | | | | | 464/88 |
| 4,385,893 | A | | 5/1983 | Kirschey | |
| 8,758,149 | B1 | | 6/2014 | Hewitt et al. | |
| 9,109,637 | B2 | | 8/2015 | Roberts et al. | |
| 9,249,837 | B2 | | 2/2016 | Hewitt et al. | |
| 2020/0224729 | A1 | * | 7/2020 | Lawrence | F16D 3/74 |

FOREIGN PATENT DOCUMENTS

EP   0314635 A2   5/1989

OTHER PUBLICATIONS

SAE standard for flywheel size filed by applicant Jul. 14, 2022, Sae J620 Oct. 2020. (Year: 2022).*

* cited by examiner

*Primary Examiner* — Greg Binda
(74) *Attorney, Agent, or Firm* — Robinson & Cole LLP

(57) ABSTRACT

A flywheel coupling assembly for transmitting torque between a shaft and a flywheel includes a clamp ring assembly and a flywheel attachment flange assembly. The clamp ring assembly includes a first clamp ring adapted to be coupled to the shaft, a second clamp ring coupled to a coupling hub of the flywheel attachment flange assembly, and an elastomeric center element coupling the first and second clamp rings. A planer plate element of the flywheel attachment flange assembly is adapted to be coupled with the flywheel. Also disclosed are a method of forming a flywheel coupling assembly and a method of coupling a flywheel to a shaft.

16 Claims, 4 Drawing Sheets

FLEXIBLE FLYWHEEL COUPLING

TECHNICAL FIELD

This patent disclosure relates generally to machines incorporating flywheels and, more particularly, to adapters for coupling a flywheel to a shaft.

BACKGROUND

Flywheel adapters are used on reciprocating engines to smooth the power output of an energy source. It can be difficult and time consuming, however, to install flywheel couplings. As a result, installation and service can be expensive. While para-flex flywheel design couplings allow for a certain amount of flexibility in installation, they are typically difficult to install, including multiple flange/hub pieces and requiring a special coupling element. It may be desirable to provide a coupling arrangement that minimizes installation difficulties without downgrading performance features.

SUMMARY

The disclosure describes in one aspect, a method of coupling a flywheel to a shaft along an assembly axis. The method includes providing a clamp ring assembly defining a clamp ring axis. The clamp ring assembly includes a first clamp ring disposed substantially adjacent a first axial end of the clamp ring assembly, a second clamp ring disposed substantially adjacent a second axial end of the clamp ring assembly, and a center element formed of an elastomer material, the center element extending axially and circumferentially between the first and second clamp rings. The first and second clamp rings are substantially parallelly disposed and spaced apart along the clamp ring axis. The method further includes coupling the second clamp ring to a coupling hub of a flywheel attachment flange assembly, inserting a plurality of fasteners extending from a planer plate element of the flywheel attachment flange assembly into openings in the flywheel to couple to flywheel attachment flange assembly to the flywheel, and coupling the first axial end of the clamp ring assembly to the shaft.

In another aspect, the disclosure describes a flywheel coupling assembly for transmitting torque between a shaft and a flywheel approximately aligned on an assembly axis. The flywheel coupling assembly includes a clamp ring assembly defining a clamp ring axis, and a flywheel attachment flange assembly defining a flywheel attachment axis. The flywheel attachment axis and the clamp ring are substantially coincident and adapted to be substantially aligned with the assembly axis. The clamp ring assembly includes a first clamp ring, a second clamp ring disposed spaced apart from and substantially parallel to the first clamp ring along the clamp ring axis, and a center element formed of an elastomer material, the center element extending axially and circumferentially between the first and second clamp rings. The clamp ring assembly includes a first axial end and a second axial end. The first clamp ring is disposed substantially adjacent the first axial end and the second clamp ring is disposed substantially adjacent the second axial end. The first axial end of the clamp ring is adapted to be coupled to the shaft. The flywheel attachment flange assembly includes a coupling hub and a planer plate element. The planer plate element includes a plurality of through holes and is adapted to be disposed adjacent the flywheel. The coupling hub the coupling hub is coupled with the second axial end of the clamp ring assembly, The disclosure describes, in yet another aspect, a method of forming a flywheel coupling assembly for coupling a flywheel to a shaft along an assembly axis. The method includes providing a clamp ring assembly defining a clamp ring axis. The clamp ring assembly includes a plurality of first arcuate coupling segments, a plurality of second arcuate coupling segments, and a center element formed of an elastomer material. Each first arcuate coupling segment includes a first arcuate portion extending between first segment ends, the first arcuate coupling segments being arranged to form a first clamp ring with adjacent first arcuate coupling segments having proximally disposed first segment ends. Each second arcuate coupling segment includes a second arcuate portion extending between second segment ends, the second arcuate coupling segments being arranged to form a second clamp ring with adjacent second arcuate coupling segments having proximally disposed second segment ends. The first and second clamp rings are substantially parallelly disposed and spaced apart along the clamp ring axis, the first clamp ring being disposed substantially adjacent a first axial end of the clamp ring assembly, the second clamp ring being disposed substantially adjacent a second axial end of the clamp ring assembly, and the center element extending axially and circumferentially between the first and second clamp rings. The method further includes coupling the second clamp ring to a coupling hub of a flywheel attachment flange assembly, the flywheel attachment flange assembly including the coupling hub and a planer plate element.

BRIEF DESCRIPTION OF THE DRAWING(S)

DETAILED DESCRIPTION

Figure 1:
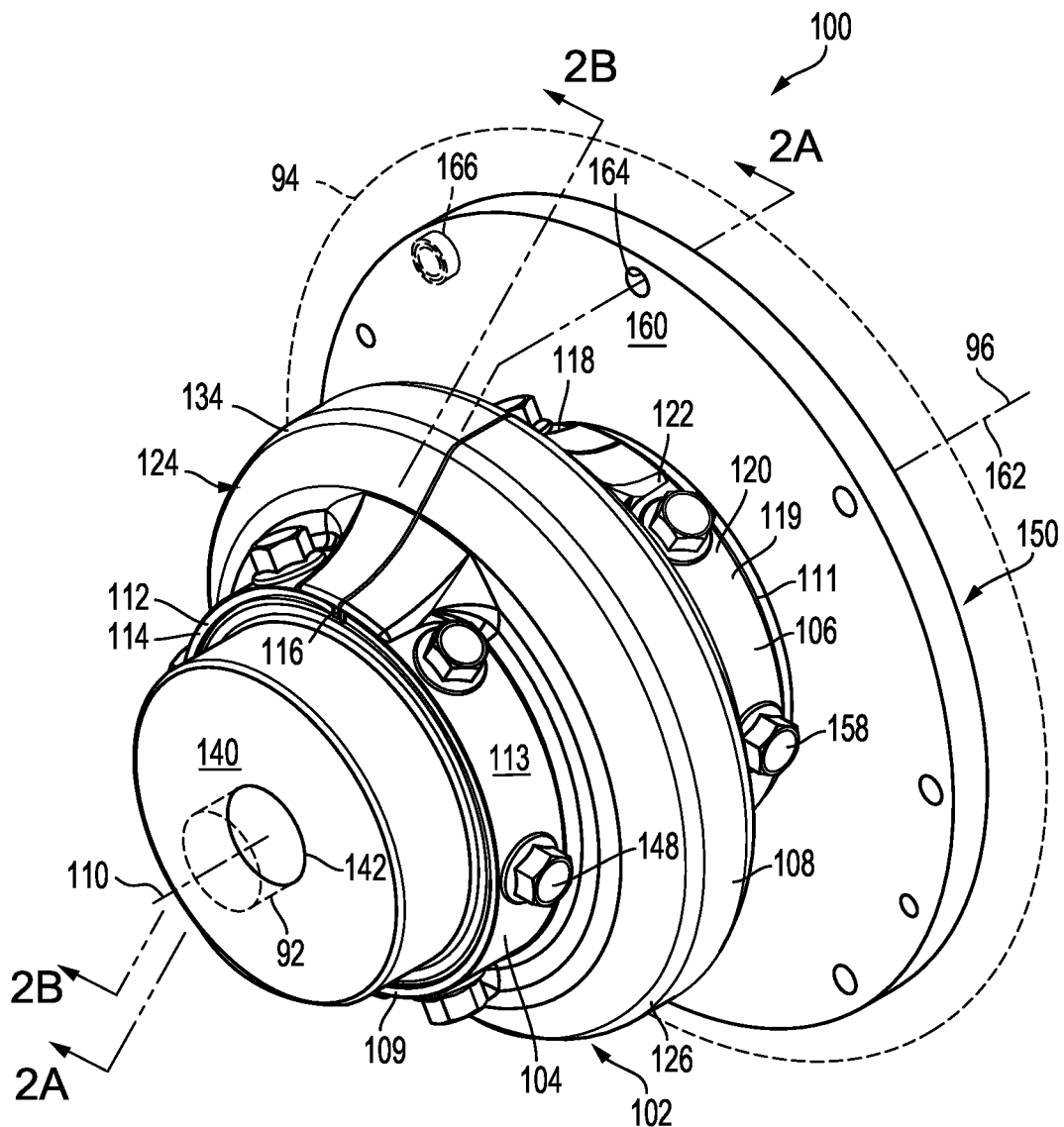
FIG. 1 is an isometric view of a flywheel coupling assembly according to aspects of this disclosure.
Figure 2A:
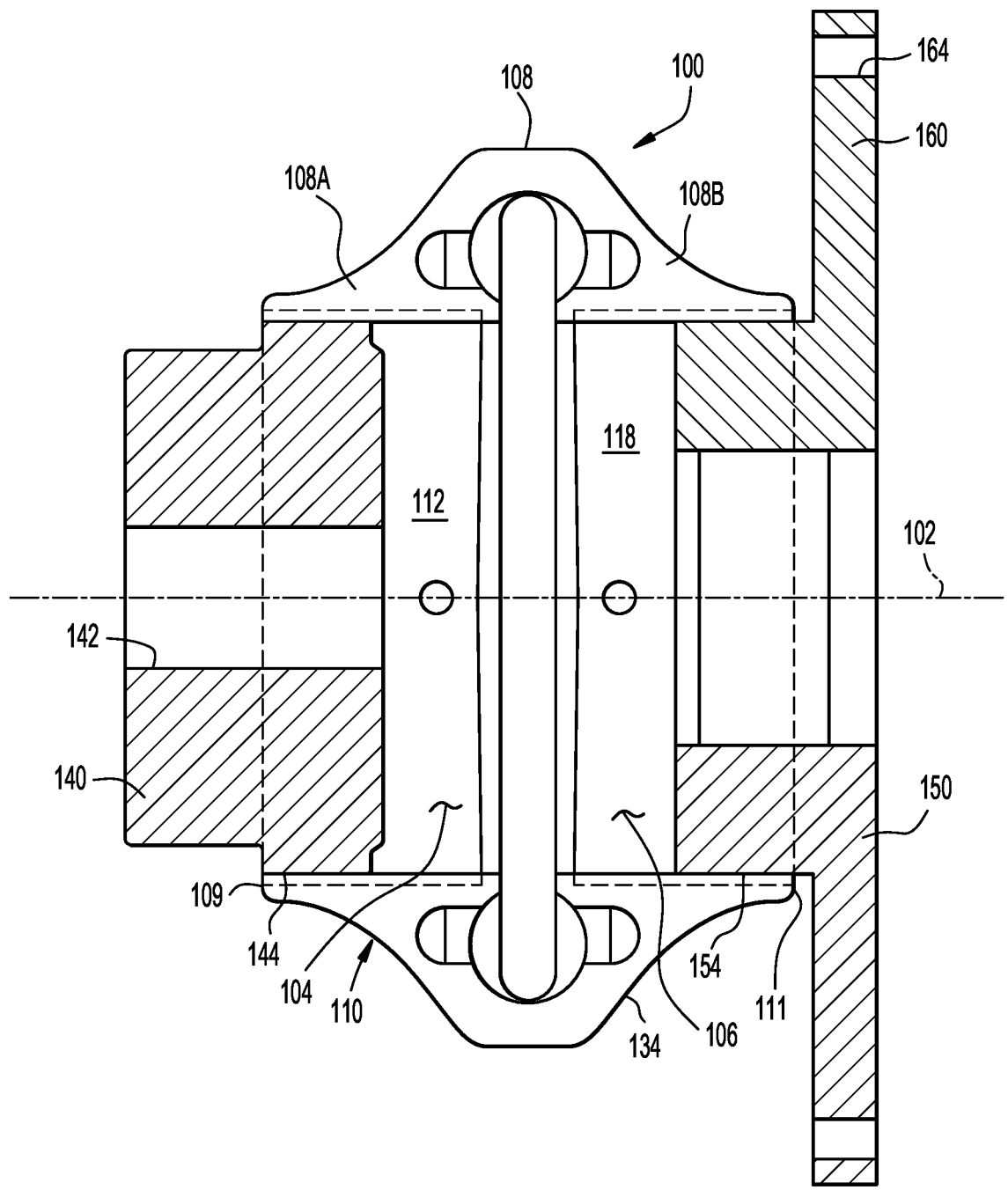
FIG. 2 is a cross-sectional view in of the flywheel coupling assembly taken along line 2A-2A (i.e., along the interface between opposing halves of the clamp ring assembly) in FIG. 1
FIG. 2B is a cross-sectional view in of the flywheel coupling assembly taken along line 2B-2B in FIG. 1.
Figure 2B:
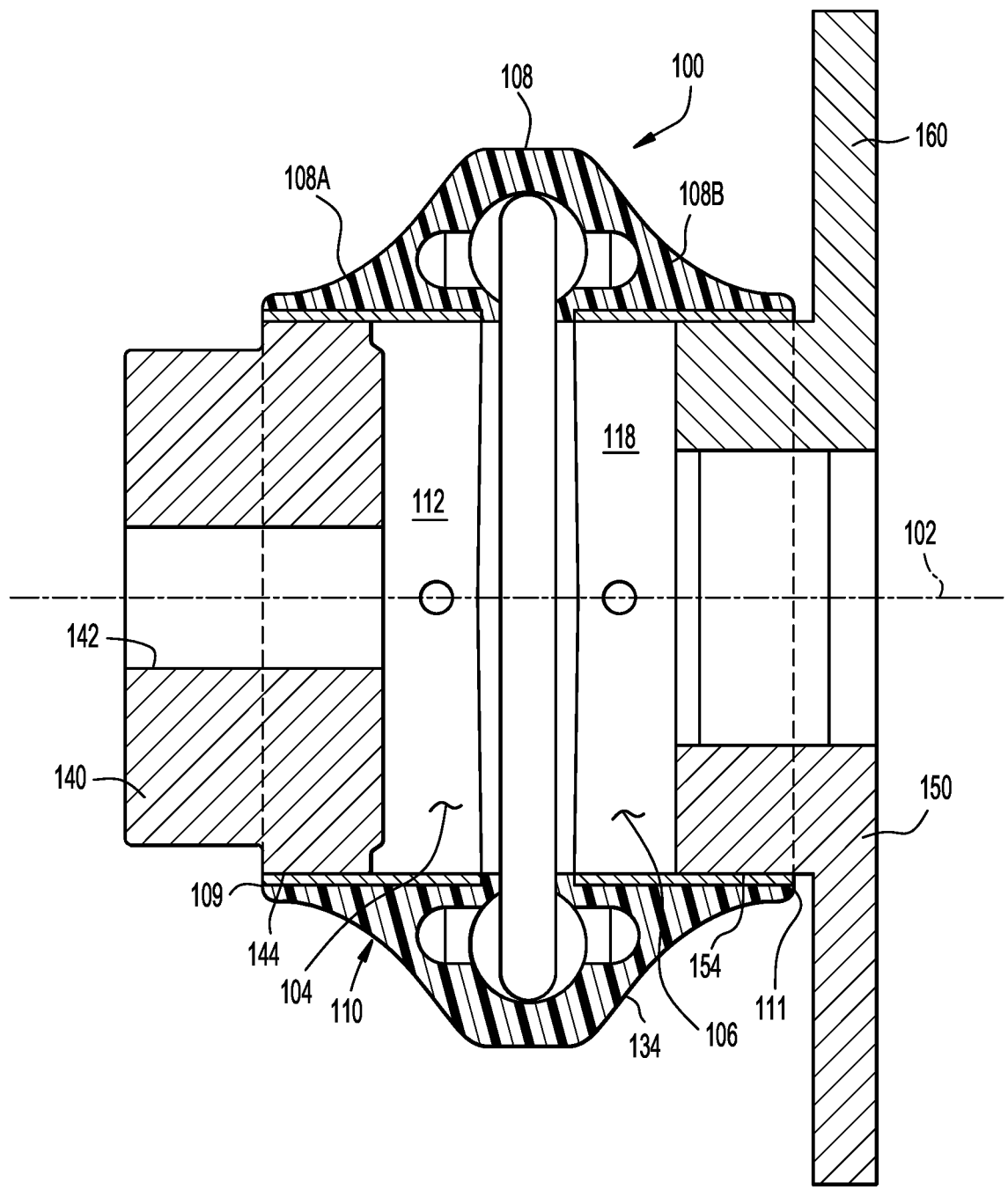

This disclosure relates to a flywheel coupling assembly 100 for transmitting torque between a shaft 92 and a flywheel 94 (represented in phantom generally in FIG. 1) approximately aligned along an assembly axis 96. The flywheel coupling assembly 100 includes a clamp ring assembly 102 and a flywheel attachment flange assembly 150.

Turning first to the clamp ring assembly 102, the clamp ring assembly 102 includes a first clamp ring 104 and a second clamp ring 106. The first and second clamp rings 104, 106 are substantially parallelly disposed and spaced apart along the clamp ring axis 110, the first clamp ring 104 being disposed substantially adjacent a first axial end 109, and the second clamp ring 106 being disposed substantially adjacent a second axial end 111. The first and second clamp rings 104, 106 are joined by a center element 108 that is formed of an elastomeric material. While the first and second clamp rings 104, 106 are substantially the same size in the illustrated embodiment, it will be appreciated that they may be of different diameters or widths, as dictated by the adjacent structures to which they will be coupled.

Each of the first and second clamp rings 104, 106 includes a plurality of arcuate coupling segments. That is, the first clamp ring 104 includes at least two first arcuate coupling segments 112, 113. Each of the first arcuate coupling segments 112, 113 includes a first arcuate portion 114 that extends between first segment ends 116, 117. The first segment ends 116, 117 of the first arcuate coupling segments 112, 113 are placed proximally to one another to form the first clamp ring 104. In at least one embodiment, the first segment ends 116, 117 are disposed substantially parallel to the clamp ring axis 110.

Similarly, the second clamp ring 106 includes at least two second arcuate coupling segments 118, 119. Each of the second arcuate coupling segments 118, 119 includes a second arcuate portion 120 that extends between second segment ends 122, 123. The second segment ends 122, 123 of the second arcuate coupling segments 118, 119 are placed proximally to one another to form the second clamp ring 106. In at least one embodiment, the second segment ends 122, 123 are disposed substantially parallel to the clamp ring axis 110.

While in the illustrated embodiment, each of the first and second clamp rings 104, 106 includes two arcuate coupling segments (112 and 113, 118 and 119, respectively), each of which forms one half of the first and second clamp rings 104, 106, those of skill in the art will appreciate that other configurations may be used. For instance, the arcuate coupling segments may comprise quarters or thirds, or combinations thereof, such as, for example, two quarter arcuate segments and a one half arcuate segment. The first and second clamp rings 104, 106 may be made from any rigid material such as steel, plastic, etc.

Figure 3:
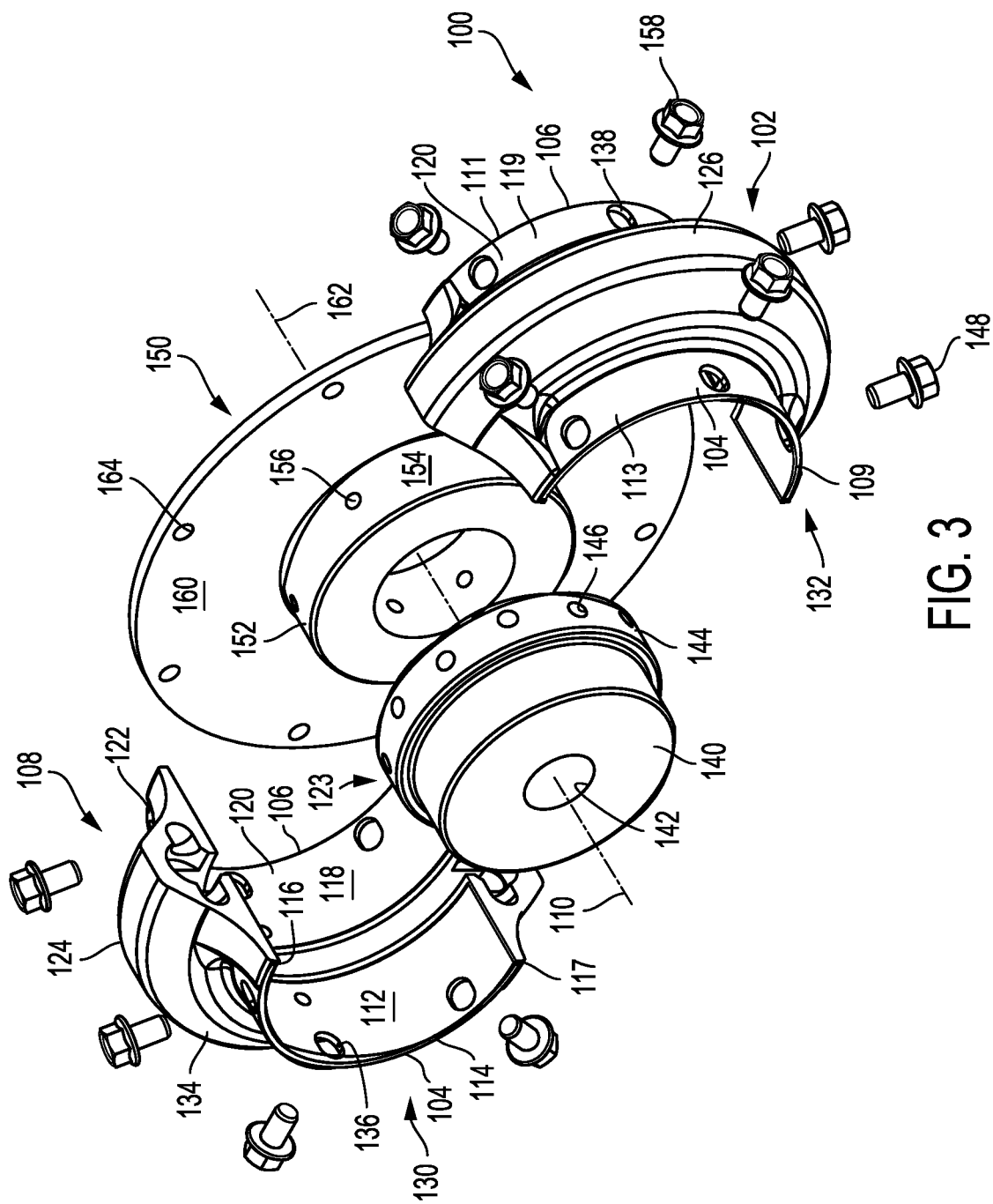
FIG. 3 is an exploded view of the flywheel coupling assembly of FIGS. 1 and 2.

The center element 108 may be formed of any suitable elastomeric material, such as rubber, urethane, or their derivatives. Coupled to each of the first clamp ring 104 and the second clamp ring 106, the center element 108 provides a certain amount of give between the first and second clamp rings 104, 106. As best seen in the exploded view of FIG. 3, the center element 108 may likewise be formed in multiple arcuate portions. That is, the center element 108 includes a number of center element portions 124, 126 corresponding to the number of pairs of the first and second arcuate coupling segments 112, 113, 118, 119. In the illustrated embodiment, the center element 108 includes a pair of center element portions 124, 126. As with the arcuate coupling segments 112, 113, 118, 119 a greater number of center element portions 124, 126 may be provided to correspond to the number of pairs of arcuate coupling segments. In the illustrated embodiment, for example, the clamp ring assembly 102 is formed as two semi-annular coupling portions 130, 132, as best shown in FIG. 3. One semi-annular coupling portion 130 includes first and second arcuate coupling segments 112, 118 joined by a center element portion 124, and the other semi-annular coupling portion 132 includes first and second arcuate coupling segments 113, 119 joined by a center element portion 126.

In order to minimize the opportunity for the center element portions 124, 126 to separate from the first and second arcuate coupling segments 112, 113, 118, 119, the elastomeric material of the center element portions 124, 126 may extend circumferentially over the first and second segment ends 116, 117, 122, 123, and in an axial direction. The center element portions 124, 126 may include a radially thickened bridging portion 134 extending axially between the first and second arcuate coupling segments 112, 113, 118, 119, as well as in a radially direction. Substantially adjacent the first and second segment ends 116, 117, 122, 123, the thickened bridging portion 134 may further extend in the axial direction to legs 108A, 108B. While not shown in the figures, those of skill in the art will appreciate that the first and second arcuate coupling segments 112, 113, 118, 119 may be formed with structures, such as one or more radially extending flanges in order to enhance adherence of the elastomeric material of the center element portions 124, 126 to the first and second arcuate coupling segments 112, 113, 118, 119.

Those of skill in the art will appreciate that the center element 108 or center element portion 124, 126 may be fabricated by any appropriate process. By way of example only, it may be made by processes such as transfer molding, injection molding, compression molding. In one such molding process, resin may be injected into the mold to impregnate a glass fiber material to form the center element 106 or center element portions 124, 126. The resin-impregnated material may then be cured. The first and second clamp rings 104, 106, or the first and second arcuate coupling segments 112, 113, 118, 119 may be fixed to the center element 108 or center element portions 124, 126 during the application of the resin material to the mold, upon curing, or upon subsequent to removal of the center element from the mold.

In order to couple the clamp ring assembly 102 to a shaft 92, a shaft hub 140 may be provided. The shaft hub 140 may include an inner bore 142 sized and adapted to connect to or be engaged with shaft 92. The shaft hub 140 may further include an outer cylindrical surface 144 sized and adapted to be engaged and coupled to the first clamp ring 104. In order to couple the clamp ring assembly 102 with the shaft hub 140, the first clamp ring 104 may include a plurality of radially extending holes 136, and the shaft hub 140 may include a plurality of radially extending recesses 146. A plurality of fasteners 148 may extend through the radially extending holes 136 and into the radially extending recesses 146. The plurality of fasteners 148 may be, for example, bolts that may be threaded into the radially extending recesses 146. Washers may be provided as part of the plurality of fasteners, for example, with such bolts, in some embodiments. While not illustrated in the figures, those of skill in the art will understand that grommets may be provided adjacent the radially extending holes 136 in order to strengthen the first clamp ring 104 adjacent the radially extending holes 136, as well as the coupling of the first clamp ring 104 with the shaft hub 140.

The flywheel coupling assembly 100 further includes a flywheel attachment flange assembly 150 for use in attachment of the assembly 100 to a flywheel 94. The flywheel attachment flange assembly 150 includes a coupling hub 152 that is secured with the clamp ring assembly 102 at the second clamp ring 106. To this end, the coupling hub 152 may include an outer cylindrical surface 154 sized and adapted to be engaged and coupled to the second clamp ring 106.

While the second clamp ring 106 and the coupling hub 152 may be secured together by any appropriate arrangement, in the illustrated embodiment, the second clamp ring 106 may include a plurality of radially extending holes 138, and the coupling hub 152 may include a plurality of radially extending recesses 156. A plurality of fasteners 158 may extend through the radially extending holes 138 and into the radially extending recesses 156. The plurality of fasteners 158 may be, for example, bolts that may be threaded into the radially extending recesses 156. Washers may be provided as part of the plurality of fasteners, for example, with such bolts, in some embodiments. While not illustrated in the figures, those of skill in the art will understand that grommets may be provided adjacent the radially extending holes 138 in order to strengthen the second clamp ring 106 adjacent the radially extending holes 138, as well as the coupling of the second clamp ring 106 with the coupling hub 152.

The flywheel attachment flange assembly 150 further includes a planer plate element 160, which may be integrally formed with the coupling hub 152. In use, the planar plate element 160 is coupled to the flywheel 94 along a flywheel attachment axis 162. The planar plate element 160 may be coupled to the flywheel 94 flange by any appropriate arrangement. In the illustrated embodiment, for example, the planar plate element 160 includes a plurality of through holes 164 that may receive a plurality of fasteners 166 such as, for example, bolts. According to an aspect of this disclosure, the plurality of through holes 164 may be arranged to cooperate with corresponding openings in SAE standard size flywheel. Those of skill in the art will appreciate that SAE international standards are published standards that provide uniform material and dimensional standards for various components and devices in order to facilitate advancement and uniformity in the associated industry.

INDUSTRIAL APPLICABILITY

One or more of the disclosed embodiments may eliminate or minimize installation difficulties associate with coupling a shaft to for rotation with a flywheel. One or more of the disclosed arrangements may obviate special coupling elements by providing a single piece flange and the use of a standard flywheel coupling assembly without sacrificing performance features. The disclosed arrangement may be more economical, as well as quicker and easier to install than traditional arrangements.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A flywheel coupling assembly for transmitting torque between a shaft and a flywheel approximately aligned on an assembly axis, the flywheel coupling assembly comprising:
   a clamp ring assembly defining a clamp ring axis and including
      a first clamp ring,
      a second clamp ring disposed spaced apart from and substantially parallel to the first clamp ring along the clamp ring axis, and
      a center element formed of an elastomer material, the center element extending axially and circumferentially between the first and second clamp rings,
      the clamp ring assembly including a first axial end and a second axial end, the first clamp ring being disposed substantially adjacent the first axial end and the second clamp ring being disposed substantially adjacent the second axial end, the first axial end of the clamp ring being adapted to be coupled to the shaft, and
   a flywheel attachment flange assembly, the flywheel attachment flange assembly including a coupling hub and a planer plate element, the planer plate element including a plurality of through holes and being adapted to be disposed adjacent the flywheel, the coupling hub defining a flywheel attachment axis, the coupling hub being coupled with the second axial end of the clamp ring assembly, the flywheel attachment axis and the clamp ring being substantially coincident, the flywheel attachment axis and the clamp ring axis being adapted to be substantially aligned with the assembly axis;
   wherein the first clamp ring and the second clamp ring each include a plurality of radially extending holes adapted to receive a plurality of fasteners.

2. The flywheel coupling of claim 1 further including a shaft hub coupled to the first axial end of the clamp ring assembly, the shaft hub being adapted to couple the clamp ring assembly to the shaft.

3. The flywheel coupling of claim 1 wherein the plurality of through holes of the planer plate element are sized and disposed in a configuration in accordance with an SAE standard size flywheel.

4. The flywheel coupling assembly of claim 1 wherein
   the first clamp ring includes a plurality of first arcuate coupling segments, each first arcuate coupling segment including a first arcuate portion extending between first segment ends,
   the second clamp ring includes a plurality of second arcuate coupling segments equal in number to the plurality of first arcuate coupling segments, each second arcuate coupling segment including a second arcuate portion extending between second segment ends,
   the center element includes a plurality of center element portions equal in number to the plurality of first arcuate coupling segments, and
   a center element portion of said plurality of center element portions being secured with a respective one of said plurality of first arcuate coupling segments and a respective one of said plurality of second arcuate coupling segments to form a plurality of semi-annular coupling portions, the semi-annular coupling portions being arranged with the first arcuate coupling segments forming the first clamp ring with adjacent first arcuate coupling segments having proximally disposed first segment ends, and the second arcuate coupling segments forming the second clamp ring with adjacent second arcuate coupling segments having proximally disposed second segment ends.

5. The flywheel coupling of claim 4 wherein the elastomer material extends over at least a portion of the plurality of first arcuate coupling segments and at least a portion of the plurality of second arcuate coupling segments.

6. The flywheel coupling of claim 5 wherein the elastomer material extends substantially over the plurality of first arcuate coupling segments and the plurality of second arcuate coupling segments except for areas around the plurality of radially extending holes of the first clamp ring and the plurality of radically extending holes of the second clamp ring.

7. The flywheel coupling of claim 4 wherein some of the plurality of fasteners couple the second axial end to the coupling hub.

8. The flywheel coupling of claim 7 wherein the coupling hub includes a plurality of radially extending recesses, some of the plurality of fasteners being received within the radially extending recesses.

9. The flywheel coupling of claim 4 wherein the elastomer material extends radially relative to the first segment ends and the second segment ends.

10. The flywheel coupling of claim 4 wherein the first segment ends and the second segment ends extend generally parallel to the clamp ring axis.

11. The flywheel coupling of claim 10 wherein the first segment ends are spaced apart from one another and the elastomer material is disposed between the first segment ends, and the second segment ends are spaced apart from one another and the elastomer material is disposed between the second segment ends.

12. A method of coupling a flywheel to a shaft along an assembly axis, the method comprising:
   providing a clamp ring assembly defining a clamp ring axis and including
      a first clamp ring disposed substantially adjacent a first axial end of the clamp ring assembly,
      a second clamp ring disposed substantially adjacent a second axial end of the clamp ring assembly, the first and second clamp rings being substantially parallelly disposed and spaced apart along the clamp ring axis, and
      a center element formed of an elastomer material, the center element extending axially and circumferentially between the first and second clamp rings, coupling the second clamp ring to a coupling hub of a flywheel attachment flange assembly,
   inserting a plurality of first fasteners extending from a planer plate element of the flywheel attachment flange assembly into openings in the flywheel to couple the flywheel attachment flange assembly to the flywheel, and
   coupling the first axial end of the clamp ring assembly to the shaft;
   wherein the first clamp ring and the second clamp ring each include a plurality of radially extending holes adapted to receive a plurality of second fasteners.

13. The method of claim 12 wherein providing the clamp ring assembly includes
   providing a plurality of first arcuate coupling segments, each first arcuate coupling segment including a first arcuate portion extending between first segment ends,
   providing a plurality of second arcuate coupling segments equal in number to the plurality of first arcuate coupling segments, each second arcuate coupling segment including a second arcuate portion extending between second segment ends,
   providing a plurality of center element portions equal in number to the plurality of first arcuate coupling segments,
   coupling center element portions between adjacent first arcuate coupling segments and second arcuate coupling segments,
   adjacently disposing the first segment ends to form the first clamp ring, and
   adjacently disposing the second segment ends to form the second clamp ring.

14. The method of claim 12 wherein coupling the first axial end of the clamp ring assembly to the shaft includes coupling the first axial end of the clamp ring assembly to a shaft hub, and coupling the shaft hub to the shaft.

15. The method of claim 14 wherein coupling the first axial end of the clamp ring assembly to the shaft hub includes inserting some of the plurality of second fasteners through the plurality of radially extending holes in the first clamp ring and into a plurality of radially extending openings in the shaft hub.

16. The method of claim 12 wherein coupling the second axial end of the clamp ring assembly to the coupling hub includes inserting some of the plurality of second fasteners through the plurality of radially extending holes in the second clamp ring and into a plurality of radially extending openings in the coupling hub.

* * * * *

UNITED STATES PATENT AND TRADEMARK OFFICE
CERTIFICATE OF CORRECTION

PATENT NO. : 11,578,764 B2
APPLICATION NO. : 16/807831
DATED : February 14, 2023
INVENTOR(S) : Christopher England et al.

It is certified that error appears in the above-identified patent and that said Letters Patent is hereby corrected as shown below:

In the Claims

Claim 6:
Column 7, Line 19: After "plurality of", delete "radically" and insert --radially--.

Signed and Sealed this
Eighteenth Day of April, 2023

Katherine Kelly Vidal
*Director of the United States Patent and Trademark Office*